US008421930B2

(12) United States Patent
Inoo et al.

(10) Patent No.: US 8,421,930 B2
(45) Date of Patent: Apr. 16, 2013

(54) DIGITAL BROADCAST RECEIVER

(75) Inventors: Nobuyuki Inoo, Tokyo (JP); Tatsuhiko Ushiama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 76 days.

(21) Appl. No.: 13/139,818

(22) PCT Filed: Jan. 20, 2010

(86) PCT No.: PCT/JP2010/000300
§ 371 (c)(1),
(2), (4) Date: Jun. 15, 2011

(87) PCT Pub. No.: WO2010/116579
PCT Pub. Date: Oct. 14, 2010

(65) Prior Publication Data
US 2011/0249193 A1  Oct. 13, 2011

(30) Foreign Application Priority Data
Mar. 30, 2009 (JP) ................................. 2009-082441

(51) Int. Cl.
*H04N 5/50* (2006.01)
*H04N 5/445* (2011.01)
*G06F 3/00* (2006.01)
*G06F 13/00* (2006.01)

(52) U.S. Cl.
USPC ............ 348/732; 348/726; 348/570; 725/48; 725/49; 455/158.1; 455/161.2

(58) Field of Classification Search .......... 348/731–733, 348/569, 570, 725, 726; 725/37–74; 455/158.1, 455/161.2, 181.1, 186.1
See application file for complete search history.

(56) References Cited

U.S. PATENT DOCUMENTS

| 2002/0166128 | A1 | 11/2002 | Ikeda et al. |
| 2006/0230429 | A1 | 10/2006 | Van Horck |
| 2008/0005768 | A1* | 1/2008 | Sakai ............................... 725/73 |
| 2008/0115165 | A1* | 5/2008 | Choi et al. ....................... 725/44 |

FOREIGN PATENT DOCUMENTS

| JP | 2004-135166 | A | | 4/2004 |
| JP | 2007-13562 | A | | 1/2007 |
| JP | 2007-502048 | A | | 2/2007 |
| JP | 2007-201700 | A | | 8/2007 |
| JP | 2008-16910 | A | | 1/2008 |
| KR | 2008004031 | A | * | 1/2008 |
| WO | WO 02/11328 | A1 | | 2/2002 |

* cited by examiner

*Primary Examiner* — Michael Lee
(74) *Attorney, Agent, or Firm* — Birch, Stewart, Kolasch & Birch, LLP

(57) ABSTRACT

A digital broadcast receiver 1 capable of receiving a program broadcast by a plurality of services from among broadcast electric waves to which a single physical channel is assigned and provided with at least an I/O device (a display 18) is provided. The digital broadcast receiver includes a control unit (15) for determining whether or not there are identical services in services which the digital broadcast receiver has received in each of a plurality of regions, and for, when determining that there are identical services in the services, generating a service list for each of the regions (countries) or for each of the services (broadcast stations) while merging the physical channels, and then displaying the service list generated thereby on the I/O device to urge a viewer to perform a selection input.

5 Claims, 7 Drawing Sheets

FIG.3

| Country code | Country Name Code | Country |
|---|---|---|
| 0x444555 | DEU | Germany |
| 0x465241 | FRA | France |
| 0x495441 | ITA | Italy |
| 0x474252 | GBR | UK |

FIG.7
(a)
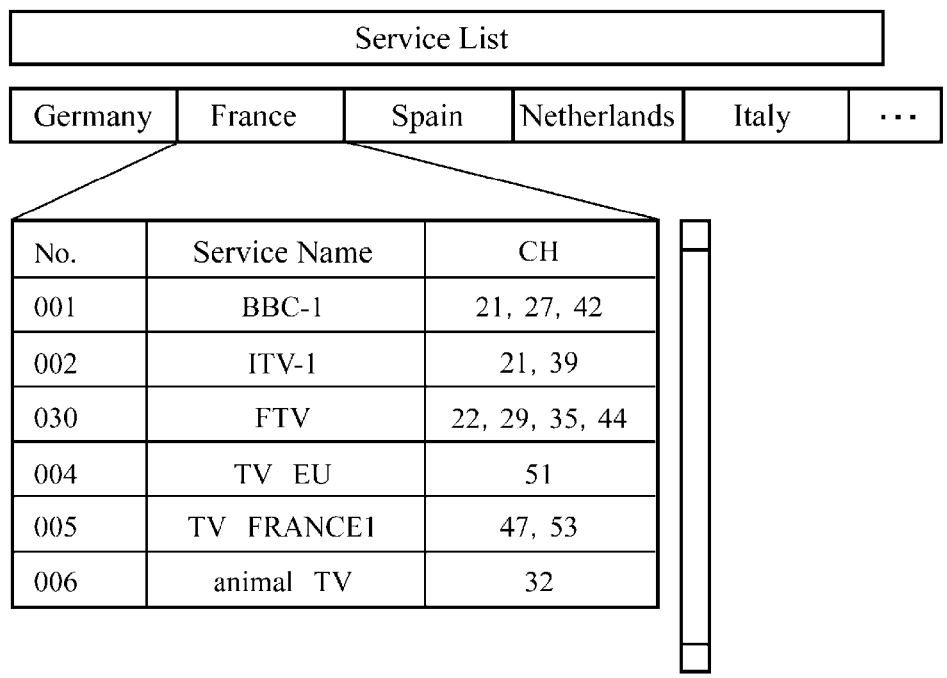
(b)
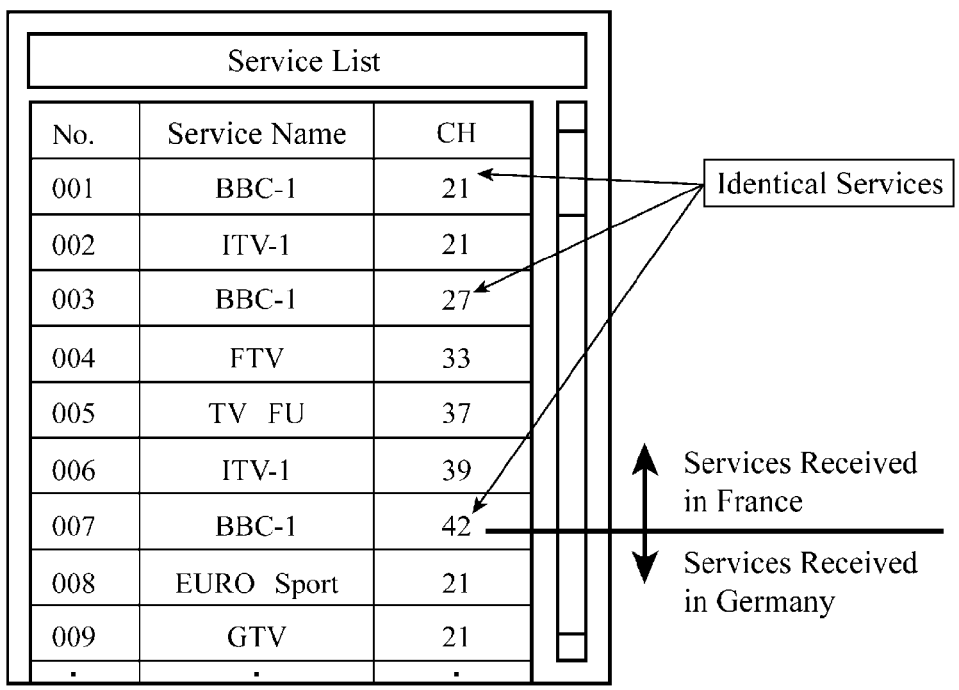

DIGITAL BROADCAST RECEIVER

FIELD OF THE INVENTION

The present invention relates to a digital broadcast receiver capable of receiving programs broadcast by a plurality of services among broadcast electric waves to which one physical channel is assigned, and, particularly, suitable for use in a vehicle.

BACKGROUND OF THE INVENTION

In the case of digital terrestrial broadcasting standards (DVB-T: Digital Video Broadcasting-Terrestrial) which have been brought into service all over the world, especially in Europe, a plurality of services (broadcast stations) broadcast video images by using transmission radio waves of a single physical channel, unlike in the case of digital terrestrial broadcasting standards in Japan (ISDB-T: Integrated Services Digital Broadcasting-Terrestrial).

Furthermore, even in a country, the physical channel for services (broadcast stations) differs from region to region. Therefore, in the case of using a DVB-T receiver intended for moving objects in a moving object, such as a vehicle, when a user registers a service through channel scanning, he or she cannot browse a registered service list easily because many different physical channels have an identical service, as shown in FIG. 7(b), for example.

Particularly in Europe, because there is heavy traffic between countries, the number of physical channels registered further increases because the same DVB-T standard is adopted, and it is therefore difficult for the user to select a service which the user can receive in the country where he or she is staying from the list, and, particularly, the usability of the conventional DVB-T receiver is inferior in terms of visibility. On a screen shown in FIG. 7(b), services (broadcast stations) which have been received in France are shown separately from services (broadcast stations) which have been received in Germany with a thick line.

On the other hand, patent reference 1 discloses a technology of producing a monitor display of an EPG (electronic program guide) by using a limited display area on a monitor effectively to merge the EPG into an on-screen video image. Furthermore, patent reference 2 discloses a technology of collectively displaying information about identical programs being broadcast by an identical broadcast station in a single row to increase the amount of information included in a display of a program list.

RELATED ART DOCUMENT

Patent Reference

Patent reference 1: JP,2004-135166,A
Patent reference 2: JP,2007-13562,A

SUMMARY OF THE INVENTION

According to the technologies disclosed by above-mentioned patent references 1 and 2, because an electronic program guide is merged into an on-screen video image and is displayed on a limited screen, the visibility of the electronic program guide is improved and therefore the viewer can easily perform a channel selection. However, because both of the technologies are intended for handling an electronic program guide which is multiplexed into a broadcast wave and is transmitted, they cannot be adapted to digital broadcast receivers which comply with the DVB-T standard indented for moving objects according to which a service list is created while channel scanning and registration of services are carried out.

The present invention is made in order to solve the above-mentioned problem, and it is therefore an object of the present invention to provide a digital broadcast receiver whose usability is improved by using a newly-devised display form of a service list which complies with the DVB-T standard intended for moving objects.

In order to solve the above-mentioned problem, in accordance with the present invention, there is provided a digital broadcast receiver capable of receiving a program broadcast by a plurality of services from among broadcast electric waves to which a single physical channel is assigned and provided with at least an I/O device, the digital broadcast receiver including: a reception demodulating unit for converting a signal in an RF band which the digital broadcast receiver has received into a transport stream signal; and a control unit for determining whether or not there are identical services in services which the digital broadcast receiver has received in each of a plurality of regions, and for, when determining that there are identical services in the services, making a region identification on a basis of identification information included in the above-mentioned transport stream signal, generating a service list for each of the above-mentioned regions while merging the above-mentioned physical channels, and then displaying the above-mentioned service list generated thereby on the above-mentioned I/O device to urge a viewer to perform a selection input.

The digital broadcast receiver in accordance with the present invention can provide improved usability by using a newly-devised display form of a service list which complies with the DVB-T standard intended for moving objects.

BRIEF DESCRIPTION OF THE FIGURES

FIG. 3 is a view showing a correspondence between country codes each of which can be included in the MPEG-TS signal which the digital broadcast receiver in accordance with Embodiment 1 of the present invention generates and countries in tabular form;

FIG. 7 is a view showing a comparison between an example of a display form of a service list generated by the digital broadcast receiver in accordance with the Embodiment 1 of the present invention, and a conventional example of the display form of a service list.

EMBODIMENTS OF THE INVENTION

Hereafter, the preferred embodiments of the present invention will be explained in detail with reference to the accompanied drawings.

Embodiment 1

Figure 1:
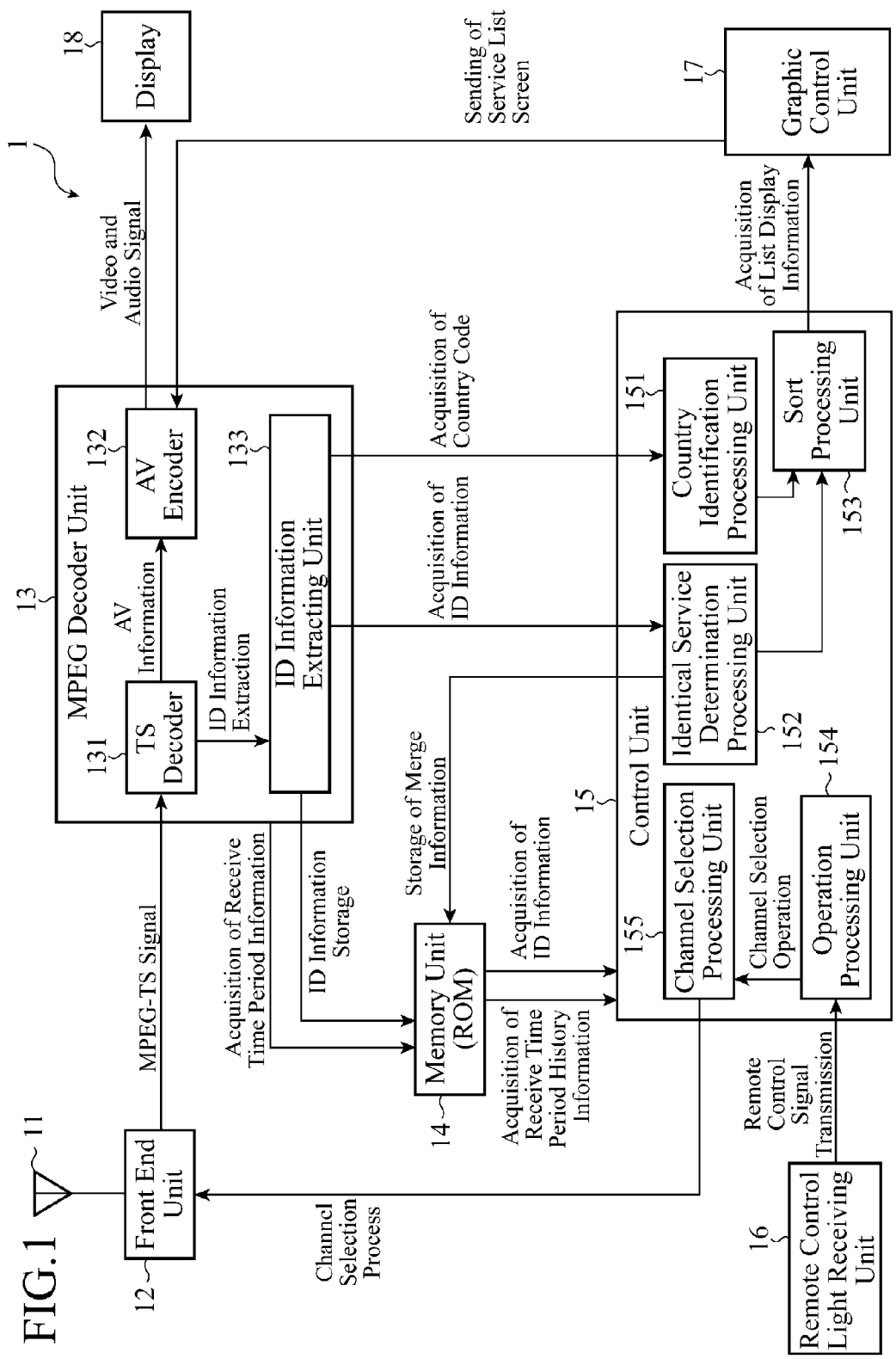
FIG. 1 is a block diagram showing the internal structure of a digital broadcast receiver in accordance with Embodiment 1 of the present invention.

FIG. 1 is a block diagram showing the internal structure of a digital broadcast receiver in accordance with Embodiment 1 of the present invention.

As shown in FIG. 1, the digital broadcast receiver 1 in accordance with Embodiment 1 of the present invention is comprised of an antenna unit 11, a front end unit 12, an MPEG (Moving Picture Experts Group) decoder unit 13, a memory unit 14, a control unit 15, a remote control light receiving unit 16, a graphic control unit 17, and a display 18.

In FIG. 1, the antenna unit 11 receives terrestrial wave digital television broadcasts in an RF band (including a UHF (Ultra High Frequency) band and a VHF (Very High Frequency) band in this embodiment), and furnishes them to the front end unit 12, and the front end unit 12 down-converts a selected one of these terrestrial wave digital television broadcasts into a signal having an IF (intermediate frequency) level and carries out OFDM demodulation by using an OFDM (Orthogonal Frequency Division Multiplex) demodulator built therein to generate an MPEG-TS (Transport Streaming) signal and then furnishes this MPEG-TS signal to the MPEG decoder unit 13.

The MPEG decoder unit 13 includes a TS decoder 131, an AV encoder 132, and an ID information extracting unit 133.

The TS decoder 131 demultiplexes the MPEG-TS signal inputted thereto into video and audio data and ID information, which are included in the MPEG-TS signal inputted thereto, and delivers the video and audio data to the AV encoder 132 and also delivers the ID information to the ID information extracting unit 133. The AV encoder 132 generates a video and audio signal from the video and audio data inputted thereto and outputs the video and audio signal to the display 18, and the ID information extracting unit 133 outputs the ID information which it has acquired from the TS decoder 131 to the control unit 15.

The ID information about services, which has been acquired by the ID information extracting unit 133, and the receive period during which the service currently being watched has been received, as well as a service list generated by the control unit 15, are stored, as a history, in the memory unit 14. In this history, a priority is assigned to each physical channel monitored by the control unit 15 according to the receive period of each physical channel. The longer receive period each physical channel has, the higher priority each physical channel has.

The control unit 15 has a function of determining whether or not there are identical services in the services which the receiver has received in each of a plurality of regions (in this case, each of a plurality of countries), generating a service list while merging the corresponding physical channels for each country or for each service if there are identical services in the services which the receiver has received in each of the plurality of regions, and displaying the service list generated thereby on the display 18 via the graphic control unit 17 and the AV encoder 132 to urge a viewer to perform a selection input using a not-shown remote controller.

The control unit 15 also has a function of, when the receiver becomes unable to receive a service because of a change in the receiving environment due to a movement of the receiver, for example, carrying out channel scanning of physical channels providing the same service automatically according to the priorities which are assigned to the physical channels according to the histories of the receive periods of the physical channels stored in the memory unit 14.

To this end, the control unit 15 includes a country identification processing unit 151, an identical service determination processing unit 152, a sort processing unit 153, an operation processing unit 154, and a channel selection processing unit 155.

The country identification processing unit 151 makes a country identification from a country code outputted by the ID information extracting unit 133, and the identical service determination processing unit 152 determines whether or not there are identical services from ID information outputted by the ID information extracting unit 133.

When determining whether or not there are identical services, the identical service determination processing unit 152 refers to either information about the numbers of services defined for a single region (LCNs: Logical Channel Numbers), which is included in the ID information, or TS identification information (TS_ID), service identification information (service_ID), and information about service arrangement (service_type), which are included in the ID information. As an alternative, the identical service determination processing unit can refer to service names (service_name). The details of each of the pieces of information will be mentioned below.

The sort processing unit 153 generates a service list from the pieces of information outputted from the country identification processing unit 151 and the identical service determination processing unit 152 while merging the corresponding physical channels for each country or for each service, and furnishes the service list to the graphic control unit 17.

The operation processing unit 154 captures a selection command of selecting a physical channel, which is issued by the not-shown remote controller when the viewer browses the service list displayed on the display 18 and then operates the not-shown remote controller, via the remote control light receiving unit 16, and then furnishes the selection command to the operation processing unit 154. The channel selection processing unit 155 makes a search for the physical channel which the channel selection processing unit is commanded to select (carries out the channel scanning) by controlling the local oscillation frequency of the front end unit 12 according to the physical channel.

The graphic control unit 17 converts the service list outputted by the sort processing unit 153 into such service list screen information as shown in FIG. 7(a), for example, and outputs, as a video and audio signal, the service list screen information to the display 18 which consists of a display device, such as an LCD (Liquid Crystal Display Device), via the AV encoder 132 of the MPEG decoder unit 13.

In the above-mentioned structure, the control unit 15 functions as a "control unit for determining whether or not there are identical services in services which the digital broadcast receiver has received in each of a plurality of regions, and for, when determining that there are identical services in the services, generating a service list for each of the above-mentioned regions or for each of the above-mentioned services while merging the above-mentioned physical channels, and then displaying the above-mentioned service list generated thereby on the above-mentioned I/O device to urge a viewer to perform a selection input", the not-shown remote control and the display 18 functions as the "input unit" described above, and the front end unit 12 functions as a "reception demodulating unit for down-converting a signal in an RF band which the digital broadcast receiver has received via an antenna into a transport stream signal having an intermediate frequency level".

Figure 2:
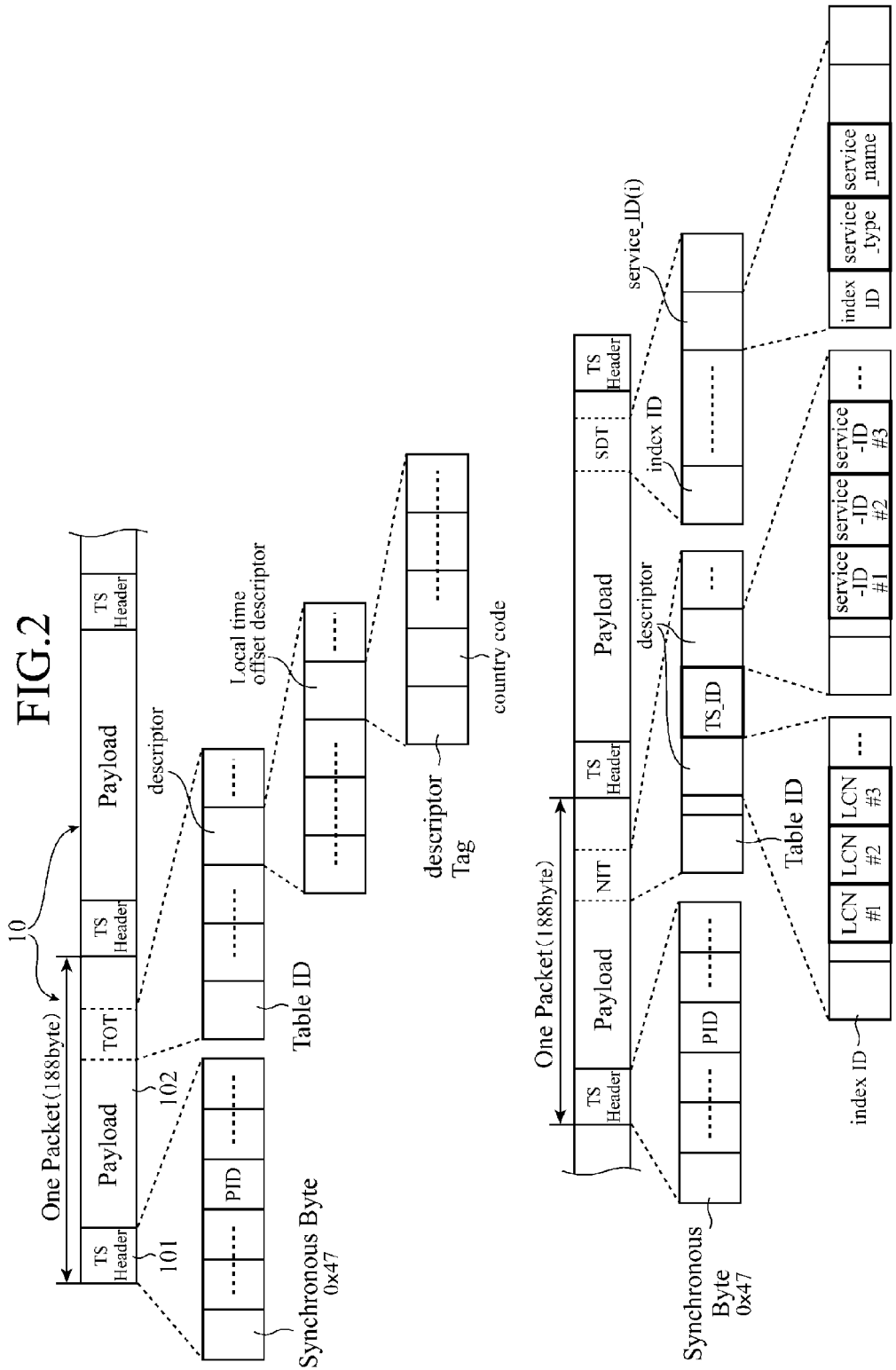
FIG. 2 is a view showing the packet format of an MPEG-TS signal which the digital broadcast receiver in accordance with Embodiment 1 of the present invention generates.

FIG. 2 is a view showing an example of the packet format of the MPEG-TS signal which the digital broadcast receiver 1 in accordance with Embodiment 1 of the present invention generates.

The MPEG-TS signal is divided into TS packets 10 each having a 188-byte fixed length, and each of which is called a TS packet, and the TS packets 10 are transmitted. As shown in FIG. 2, each TS packet 10 is constructed of a TS header part 101 and a payload part 102.

In the TS header part 101, 13-bit information which is called a packet identifier (PID) is included, and information showing what is transmitted via each TS packet 10 is set as the 13-bit information. TS packets of the same video and audio data have the same PID. Information showing whether LCN data which will be mentioned below exists is also included in the TS header part 101.

When the digital broadcast receiver 1 in accordance with Embodiment 1 of the present invention carries out the channel scanning and service registration, the control unit 15 makes a country identification from the TS packets 10 of each service (broadcast station), and displays the service list on the display 18.

At this time, the control unit makes a country identification by acquiring the country code from the Local time offset descriptor of TOT (Time Offset Table) included in the payload part 102 of each TS packet 10 and then identifying the country where the broadcast station is providing the services. The country code has a data length of 24 bits, and includes three 8-bit letters of the alphabet in ASCII code which are described therein. Because such a set of three letters of the alphabet is defined as a country code which complies with ISO3166-1, the control unit 15 can make a country identification by using indexes of a table as shown in FIG. 3, for example.

After identifying the country in the above-mentioned way, the control unit 15 determines the identical services from specific ID information which will be mentioned below among the pieces of ID information when carrying out service registration.

When determining the identical services, the control unit refers to the LCNs (Logical Channel Numbers) showing the numbers of services which are predetermined in the country. The LCNs are shown by the descriptor of the NIT (Network Information table) included in the payload part 102 of each TS packet 10. For example, the LCN of British BBC NEWS24 is "0x050". As shown in FIG. 2, each TS packet 10 has pieces of information about a plurality of services (broadcast stations), and therefore the pieces of ID information (LCNs #1 to #3) corresponding to the number of services exist in each TS packet.

As an alternative, the control unit can refer to the TS_ID, the service IDs (service_IDs) each of which is the identifier of a broadcast station, and the service type (service_type) of each service showing the broadcast type, such as television or radio. The TS_ID and the service IDs #1 to #3 are shown in the NIT included in the payload part 102 of each TS packet, and the service type (service_type) of each service is shown in the SDT (Service Description table).

Although the TS_ID is used because the TS_ID is the same in many cases when identical services exist in an identical country, the TS_ID does not necessarily exist in each TS packet. Therefore, the control unit also refers to the service ID and the service type of each service.

Figure 4:
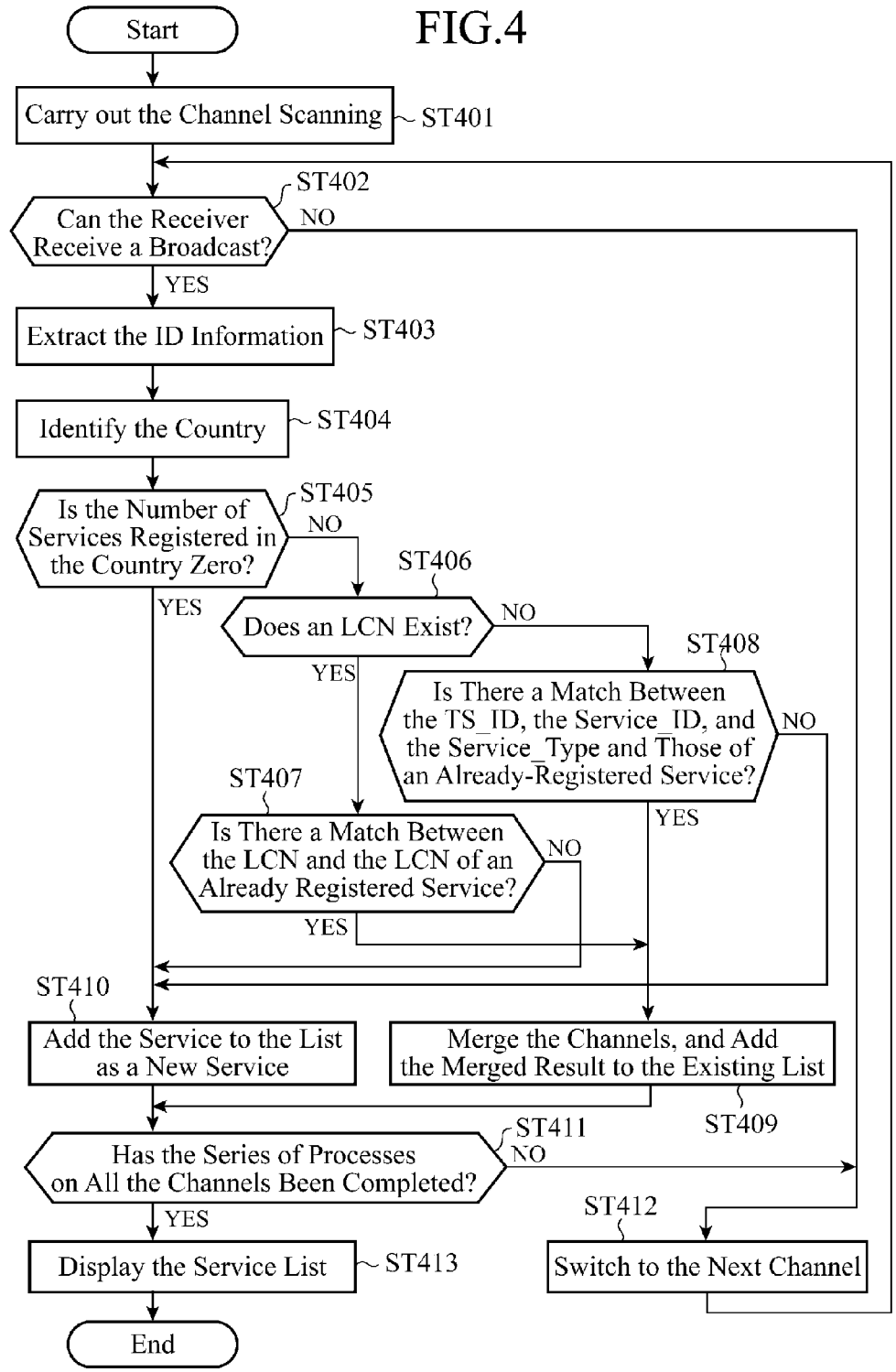
FIG. 4 is a flow chart showing a fundamental operation of the digital broadcast receiver in accordance with Embodiment 1 of the present invention.

FIG. 4 is a flow chart showing a fundamental operation of the digital broadcast receiver 1 in accordance with Embodiment 1 of the present invention.

Hereafter, the fundamental operation of the digital broadcast receiver 1 in accordance with Embodiment 1 of the present invention shown in FIG. 1 will be explained in detail with reference to the flow chart of FIG. 4.

First, in the control unit 15, the channel selection processing unit 155 controls the front end unit 12 to perform the channel scanning (step ST401). The MPEG decoder unit 13 to which TS packets 10 are furnished through the channel scanning determines whether the receiver can receive broadcasts by measuring the received field strength or decoding errors (step ST402). When determining that the receiver can receive a broadcast (if "YES" in step ST402), the TS decoder 131 extracts the ID information from each TS packet via the ID information extracting unit 133, and furnishes the ID information to the country identification processing unit 151 and the identical service determination processing unit 152 of the control unit 15 (step ST403).

In the control unit 15, the country identification processing unit 151 acquires the country code from the Local time offset descriptor of TOT included in the payload part 102 of each TS packet 10 to identify the country where the broadcast station is providing the services (step ST404).

On the other hand, after the country identification processing unit 151 identifies the country, when the identical service determination processing unit 152 determines that the number of services registered in the corresponding country where the receiver is moving is not zero (if "NO" in step ST405), and also determines that an LCN exists with reference to the TS header part 101 of each TS packet 10 (if "YES" in step ST406), the identical service determination processing unit acquires the LCN value shown by the descriptor of NIT included in the payload part 102 of each TS packet 10 to judge whether the LCN value matches the one of a service in the corresponding service list (step ST407).

When determining that no LCN exists (if "NO" in step ST406), the identical service determination processing unit 152 determines whether or not there is a match with a service in the corresponding service list with reference to the TS_ID of NIT included in the payload part 102 of each TS packet 10, and the service IDs (service_IDs), and the service types (service_types) in the SDT (step ST408).

When, in either of the determining processes of steps ST407 and ST408, determining that there is a match with a service in the corresponding service list, the identical service determination processing unit 152 determines that the received service (broadcast station) is identical to the service, and starts the sort processing unit 153 in order to merge the identical services (broadcast stations) into the same service list. The sort processing unit 153 which has received this start command merges the corresponding physical channels for each country or for each service, and adds the merged result to the service list (step ST409).

When the identical service determination processing unit, in step ST405, determines that the number of services registered is zero (if "YES" in step ST405), the sort processing unit 153 omits the above-mentioned identical service determination process and adds the service to the service list as a new service after the country identification processing unit 151 completes the country identification process (step ST410).

Next, when there is a yet-to-be-processed physical channel (if "NO" in step ST411), the front end unit 12 switches to the physical channel for the channel scanning under the control by the channel selection processing unit 155 (step ST412), and repeatedly performs the above-mentioned series of processes on all the physical channels (steps ST402 to ST410).

Finally, when the above-mentioned series of processes on all the physical channels has been completed (if "YES" in step ST411), the sort processing unit 153 furnishes the generated service list in which the identical services are merged for each country or for each service to the graphic control unit 17, and the graphic control unit 17 converts this service list into a list having such a display form as shown in FIG. 7(a), for example, and displays the list on the display 18 to urge the viewer to perform a selection input of a number (No.) for which physical channels are merged (step ST413).

Figure 5:
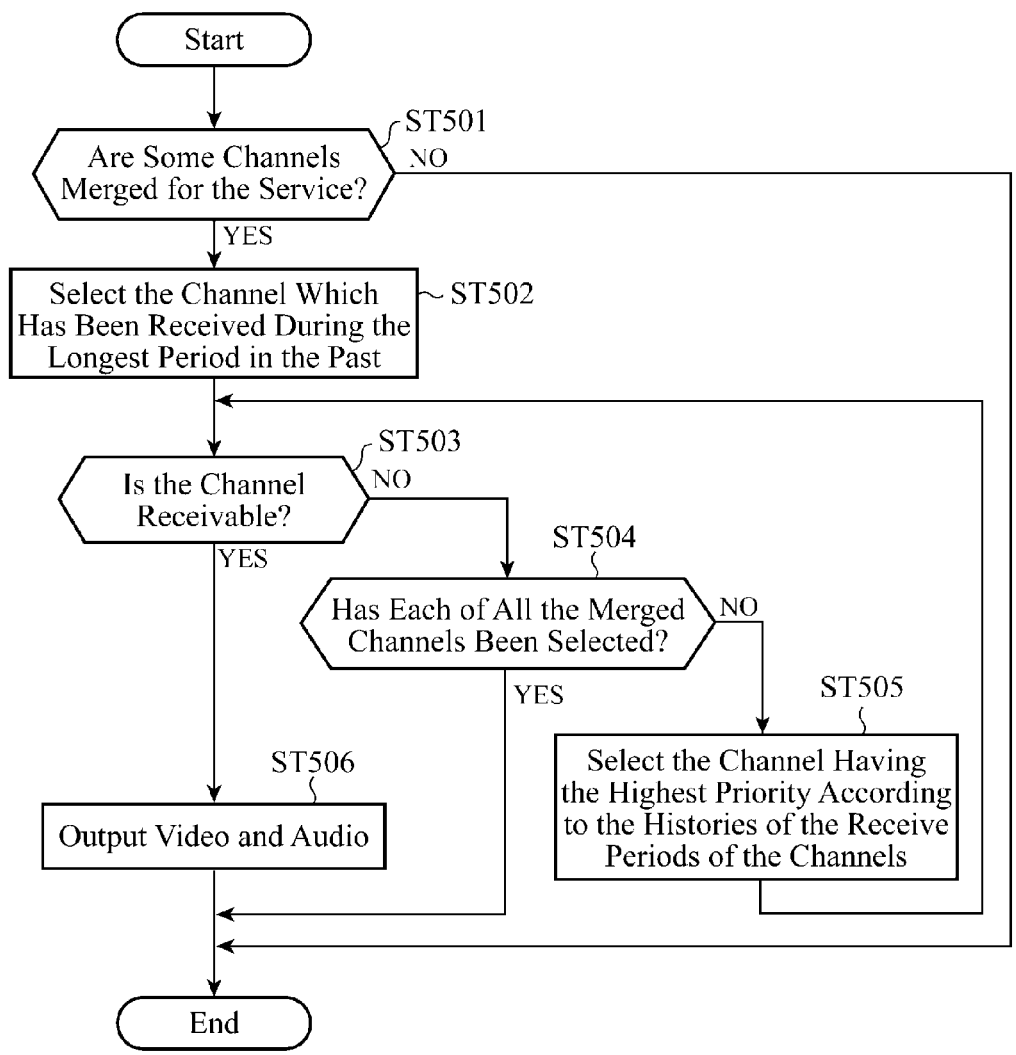
FIG. 5 is a flow chart showing a channel scanning operation of the digital broadcast receiver in accordance with Embodiment 1 of the present invention.

FIG. 5 is a flow chart showing the channel scanning operation of the digital broadcast receiver 1 in accordance with Embodiment 1 of the present invention.

Hereafter, the channel scanning operation of the digital broadcast receiver 1 in accordance with Embodiment 1 of the present invention shown in FIG. 1 will be explained in detail with reference to the flow chart of FIG. 5.

Hereafter, it is assumed that when the vehicle in which the viewer is riding is traveling, the viewer browses the service list shown in FIG. 7(a) and operates the not-shown remote controller to select one of the numbers (No.) listed by country, and then watches a program provided by a service (broadcast station) for which some physical channels are merged.

In FIG. 5, the channel selection processing unit 155 of the control unit 15 determines whether the signal received via the remote control light receiving unit 16 shows a request to watch a program provided by a service for which some physical channels are merged first (step ST501), and, when determining that the signal shows a request to watch a program provided by a service for which some physical channels are merged (if "YES" in step ST501), the channel selection processing unit 155 acquires the number of the physical channel which the digital broadcast receiver has received during the longest period in the past with reference to the memory unit 14, and selects the physical channel number and issues a search command to the front end unit 12, and the front end unit 12 which has received this command performs the channel scanning based on the physical channel number (step ST502).

When it is determined that the physical channel has a received field strength equal to or larger than a predetermined value only within a predetermined period and has a rate of decoding errors equal to or lower than a predetermined value, and therefore the digital broadcast receiver can receive the physical channel (if "YES" in step ST503), the MPEG decoder unit 13 converts the video and audio data which are separated and extracted by the TS decoder 131 into a video and audio signal by using the AV encoder 132, and outputs the video and audio signal to the display 18 (step ST506).

In contrast, when it is determined, in step ST503, that the digital broadcast receiver cannot receive the physical channel (if "NO" in step ST503), the channel selection processing unit 155 determines whether the channel selection (channel scanning) on all the merged physical channels has been completed (step ST504), and, when a yet-to-be-selected physical channel remains to be processed (if "NO" in step ST504), selects a physical channel having the next highest priority from the memory unit 14 and controls the front end unit 12 to perform the channel scanning (channel selection) (step ST505).

The priority information about the priorities assigned to the physical channels according to the histories of the receive periods of the physical channels monitored by the control unit 15 (the channel selection processing unit 155) is stored in the memory unit 14, as described above.

As described above, in the digital broadcast receiver 1 in accordance with Embodiment 1 of the present invention, the control unit (control unit 15) determines whether or not there are identical services in the services which the digital broadcast receiver has received in each of a plurality of regions (countries), generates a service list while merging the corresponding physical channels for each region or for each service if there are identical services in the services, and displays the service list generated thereby to urge a viewer to perform a selection input. Therefore, the digital broadcast receiver improves the visibility of the service list to enable the viewer to easily select a physical channel, and can provide improved usability.

The digital broadcast receiver carries out the determination of whether or not there are identical services in the services which the digital broadcast receiver has received by referring to either information (LCN) about the numbers of services defined within each region included in the ID information, or the transport stream identification information (TS_ID), the service identification information (service_ID), and the information about service arrangement (service_type) which are included in the ID information.

Furthermore, when the digital broadcast receiver 1 in accordance with Embodiment 1 of the present invention cannot receive a service, the control unit (control unit 15) searches for a physical channel according to the priorities which are assigned to physical channels providing the same service according to the histories of the receive periods of the physical channels. Therefore, the digital broadcast receiver can automatically perform the channel scanning on the physical channels sorted according to the priorities, and can provide improved performance. As a result, the digital broadcast receiver reduces the burden of the channel scanning on the user, and provides further-improved usability.

Embodiment 2

Figure 6:
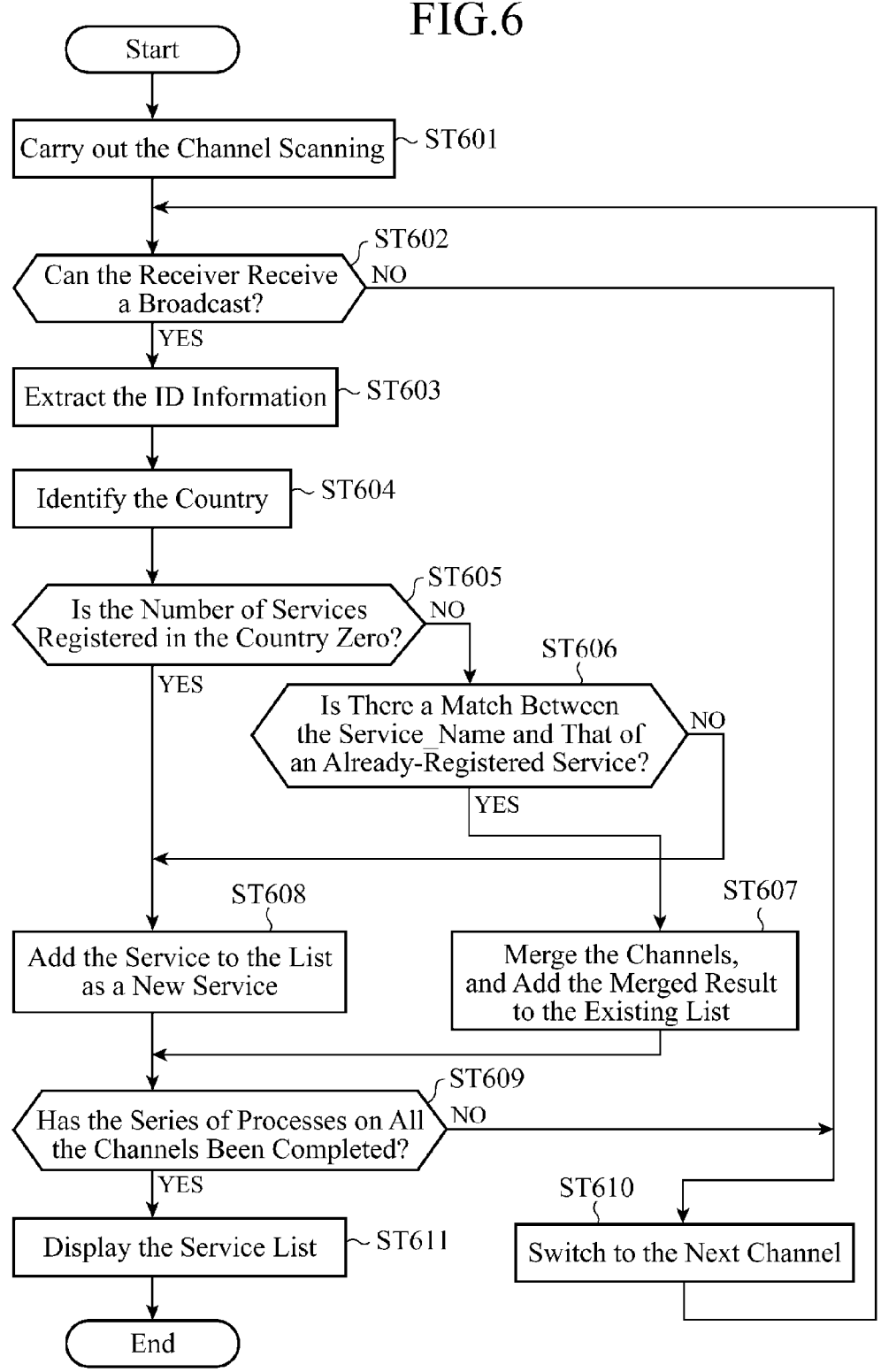
FIG. 6 is a flow chart showing a fundamental operation of a digital broadcast receiver in accordance with Embodiment 2 of the present invention.

FIG. 6 is a flow chart showing a fundamental operation of a digital broadcast receiver 1 in accordance with Embodiment 2 of the present invention.

In accordance with above-mentioned Embodiment 1, the identical service determination processing unit 152 of the control unit 15 determines whether or not there are identical services by referring to either information (LCN) about the numbers of services defined within each region included in the ID information of the TS signal, or the TS identification information, the service identification information, and the information about service arrangement which are included in the ID information. In contrast, the digital broadcast receiver in accordance with Embodiment 2, which will be explained hereafter, determines whether or not there are identical services by referring to information about service names included in the ID information.

Hereafter, the operation of the digital broadcast receiver 1 in accordance with Embodiment 2 of the present invention will be explained in detail with reference to the flow chart of FIG. 6.

The explanation will be made hereafter by assuming that the digital broadcast receiver 1 in accordance with Embodiment 2 uses the structure shown in FIG. 1, like that in accordance with above-mentioned Embodiment 1.

In FIG. 6, because processes (steps ST601 to ST604) from a process of controlling a front end unit 12 to perform channel scanning, which is carried out by a channel selection processing unit 155 of a control unit 15, up to a process of acquiring the country code from the Local time offset descriptor of TOT included in the payload part 102 of each TS packet 10 to identify the country where the broadcast station is providing the services, which is carried out by a country identification processing unit 151, are the same as those in steps ST401 to ST404 of Embodiment 1 shown in FIG. 4, an explanation of the processes will be omitted hereafter to avoid a duplicated explanation.

After the country identification processing unit 151 completes the country identification process, an identical service determination processing unit 152 determines that the number of services registered in the corresponding country where the receiver is moving is not zero (if "NO" in step ST605), and then judges whether the service name (service_name) included in the SDT of the payload part 102 of each TS packet 10 has a match with one of the names of the already-registered services (step ST606).

When determining that the service name included in the SDT has a match with one of the names of the already-registered services (if "YES" in step ST606), the identical service determination processing unit 152 determines that the received service (broadcast station) is identical to the service, and starts a sort processing unit 153 in order to merge the identical services (broadcast stations) into the same service list. The sort processing unit 153 which has received this start command merges the corresponding physical channels for each country or for each service, and adds the merged result to the service list (step ST607).

When the identical service determination processing unit, in step ST605, determines that the number of services registered is zero (if "YES" in step ST605), the sort processing unit 153 omits the above-mentioned identical service determination process and adds the service to the service list as a new service after the country identification processing unit completes the country identification process (step ST608).

Next, when there is a yet-to-be-processed physical channel (if "NO" in step ST609), the control unit 15 causes the front end unit 12 to switch to the physical channel under the control by the channel selection processing unit 155 (step ST610), and repeatedly performs the above-mentioned series of processes on all the physical channels (steps ST602 to ST608).

Then, when the above-mentioned series of processes on all the physical channels has been completed (if "YES" in step ST609), the sort processing unit 153 furnishes the generated service list in which the identical services are merged for each country or for each service to a graphic control unit 17, and the graphic control unit 17 converts this service list into a list having such a display form as shown in FIG. 7(*a*), for example, and displays the list on a display 18 to urge a viewer to perform a selection input (step ST611).

Also in Embodiment 2, when the digital broadcast receiver cannot receive a service, the control unit 15 searches for a physical channel according to priorities which are assigned to physical channels providing the same service according to histories of the receive periods of the physical channels according to a procedure shown by the flow chart shown in FIG. 5, like that in accordance with Embodiment 1.

In the digital broadcast receiver 1 in accordance with above-mentioned Embodiment 2 of the present invention, the control unit (control unit 15) determines whether or not there are identical services in the services which the digital broadcast receiver has received in each of a plurality of regions (countries), generates a service list while merging the corresponding physical channels for each region or for each service if there are identical services in the services, and displays the service list generated thereby to urge a viewer to perform a selection input. Therefore, the digital broadcast receiver improves the visibility of the service list to enable the viewer to easily select a physical channel, and can provide improved usability. The digital broadcast receiver carries out the determination of whether or not there are identical services in the services which the digital broadcast receiver has received by referring to the service names (service_name) included in the SDT of the payload part 102 of each TS packet 10.

Furthermore, when the digital broadcast receiver cannot receive a service, the control unit (control unit 15) searches for a physical channel according to the priorities which are assigned to physical channels providing the same service according to the histories of the receive periods of the physical channels, like that in accordance with Embodiment 1. Therefore, the digital broadcast receiver can automatically perform the channel scanning on the physical channels sorted according to the priorities, and can provide improved performance. As a result, the digital broadcast receiver reduces the burden of the channel scanning on the user, and provides further-improved usability.

All of the function which the control unit 15 shown in FIG. 1 has can be implemented via software, or at least a part of the function can be implemented via hardware.

For example, the data process of determining whether or not there are identical services in the services which the digital broadcast receiver has received in each of the plurality of regions, generating a service list while merging the corresponding physical channels for each region or for each service if there are identical services in the services, and displaying the service list generated on an I/O device (e.g., the display 18) to urge a viewer to perform a selection input, which is carried out by the control unit 15, can be implemented by one or more programs on a computer, or at least a part of the data process can be implemented via hardware.

INDUSTRIAL APPLICABILITY

Because the digital broadcast receiver in accordance with the present invention can improve its ease of use by using a newly-devised display form of a service list which complies with the DVB-T standard intended for moving objects, the digital broadcast receiver in accordance with the present invention is suitable for use as a vehicle-mounted digital broadcast receiver, etc.

The invention claimed is:

1. A digital broadcast receiver capable of receiving a program broadcast by a plurality of services from among broadcast electric waves to each of which a single physical channel is assigned, said digital broadcast receiver being provided with at least an I/O device, said digital broadcast receiver comprising:

a reception demodulating unit for converting a signal in an RF band which said digital broadcast receiver has received into a transport stream signal; and a control unit for determining whether or not there are identical services in services which said digital broadcast receiver has received in each of a plurality of regions, and for:

making a region identification on a basis of identification information included in said transport stream signal, generating a service list for each of said regions in such manner that, when there are identical services in the services received for a particular region, said identical services are merged into a single service entry within the service list of said region, said service entry being linked to the physical channels assigned to the respective identical services, and displaying said service list generated thereby on said I/O device to urge a viewer to perform a selection input, wherein, upon receiving via said I/O device a selection input from the viewer selecting said service entry, said control unit selects one of said linked physical channels having a highest priority among priorities assigned to said linked physical channels as the physical channel to be received by the digital broadcast receiver.

2. The digital broadcast receiver according to claim 1, wherein said control unit refers to information about a number assigned to each service defined in each region included in said identification information to determine whether or not there are identical services in the services.

3. The digital broadcast receiver according to claim 1, wherein said control unit refers to transport stream identification information, service identification information, and information about service arrangement, which are included in said identification information, to determine whether or not there are identical services in the services.

4. The digital broadcast receiver according to claim 1, wherein said control unit refers to information about service names included in said identification information to determine whether or not there are identical services in the services.

5. The digital broadcast receiver according to claim 1, wherein said control unit selects the physical channel to be received by the digital broadcast receiver according to priorities which are assigned to physical channels according to histories of receive periods of said physical channels.

* * * * *